United States Patent
Dong

(10) Patent No.: US 10,805,839 B2
(45) Date of Patent: Oct. 13, 2020

(54) DATA TRANSMISSION METHOD, RELATED DEVICE AND SYSTEM

(71) Applicant: Meizu Technology Co., Ltd., Zhuhai, Guangdong (CN)

(72) Inventor: Xiandong Dong, Guangdong (CN)

(73) Assignee: Meizu Technology Co., Ltd., Zhuhai, Guangdong (CN)

( * ) Notice: Subject to any disclaimer, the term of this patent is extended or adjusted under 35 U.S.C. 154(b) by 0 days.

(21) Appl. No.: 15/507,118

(22) PCT Filed: Jul. 13, 2015

(86) PCT No.: PCT/CN2015/083891
§ 371 (c)(1),
(2) Date: Feb. 27, 2017

(87) PCT Pub. No.: WO2016/029747
PCT Pub. Date: Mar. 3, 2016

(65) Prior Publication Data
US 2017/0280359 A1 Sep. 28, 2017

(30) Foreign Application Priority Data

Aug. 29, 2014 (CN) .......................... 2014 1 0437099

(51) Int. Cl.
*H04W 28/18* (2009.01)
*H04L 1/16* (2006.01)
*H04L 29/12* (2006.01)
*H04W 72/12* (2009.01)
*H04L 1/00* (2006.01)
*H04L 12/707* (2013.01)
*H04L 12/715* (2013.01)

(52) U.S. Cl.
CPC .......... *H04W 28/18* (2013.01); *H04L 1/1614* (2013.01); *H04L 61/25* (2013.01); *H04W 72/12* (2013.01);
(Continued)

(58) Field of Classification Search
None
See application file for complete search history.

(56) References Cited

U.S. PATENT DOCUMENTS 5,162,790 A 11/1992 Jasinski
9,100,177 B2 * 8/2015 Dangui ................ H04L 1/1614
(Continued)

FOREIGN PATENT DOCUMENTS

CN 102917463 A 2/2013
CN 103095429 A 5/2013
(Continued)

*Primary Examiner* — Yaotang Wang
(74) *Attorney, Agent, or Firm* — Rudy J. Ng; Bret E. Field; Bozicevic, Field & Franis LLP

(57) ABSTRACT

Disclosed in the embodiments of the present invention is a data transmission method. The method comprises: simultaneously receiving data simultaneously transmitted by multiple transmitters, the data comprises multiple data frames simultaneously transmitted by at least one transmitter; generating a chunking acknowledgment message frame according to the receiving state of the data, the chunking acknowledgment message frame contains a group information identifier and data receiving state information, wherein the group information identifier is used to indicate multiple transmitters which belong to the same group pre-set correspondingly by the chunking acknowledgment message frame, and the data receiving state information is used to indicate the data receiving states of various transmitters which belong to the same group, the data receiving states comprise the receiving states of the multiple data frames simultaneously transmitted by at least one transmitter; and transmitting the chunking acknowledgment message frame to the multiple transmitters. By means of the present invention, the technical problems of being not beneficial to effective spectrum utilization and being not beneficial to power saving of user equipment which are caused by
(Continued)

replying an ACK frame to the user equipment in order are solved, thereby improving the effective spectrum utilization.

6 Claims, 8 Drawing Sheets

(52) U.S. Cl.
CPC .............. *H04L 45/24* (2013.01); *H04L 45/46* (2013.01); *H04L 2001/0093* (2013.01)

(56) References Cited

U.S. PATENT DOCUMENTS

| | | | | |
|---|---|---|---|---|
| 2010/0031110 | A1* | 2/2010 | Seok | ..................... H04L 1/1621 714/748 |
| 2010/0111029 | A1 | 5/2010 | Chou et al. | |
| 2011/0286377 | A1* | 11/2011 | Sampath | ................ H04L 1/1671 370/312 |
| 2012/0195250 | A1* | 8/2012 | Jain | ........................ H04L 1/1614 370/312 |
| 2012/0213122 | A1* | 8/2012 | Gong | ................... H04B 7/0452 370/254 |
| 2013/0301569 | A1 | 11/2013 | Wang et al. | |
| 2016/0373559 | A1* | 12/2016 | Nabetani | ................... H04L 1/16 |

FOREIGN PATENT DOCUMENTS

| | | |
|---|---|---|
| CN | 103326827 A | 9/2013 |
| CN | 103858374 A | 6/2014 |
| CN | 103957087 A | 7/2014 |
| CN | 103957089 A | 7/2014 |
| GB | 2439367 A | 12/2007 |
| WO | WO2010092115 A1 | 8/2010 |

\* cited by examiner

DATA TRANSMISSION METHOD, RELATED DEVICE AND SYSTEM

The present application claims the priority of Chinese Application No. 201410437099.1, filed in the Chinese Patent Office on Aug. 29, 2014, and entitled "DATA TRANSMISSION METHOD, RELATED DEVICE AND SYSTEM", the entire contents of which are herein incorporated by reference.

FIELD OF THE INVENTION

The present invention relates to the field of communications, and particularly relates to a data transmission method, a related device and a related system.

BACKGROUND OF THE INVENTION

Various wireless communication technologies have been developed recently with the progress of information communication technology. The wireless local area network (WLAN) is a technology of wirelessly surfing the Internet at home or in enterprises or in areas providing specific services by using portable terminals (e.g., intelligent mobile terminals, tablet computers, portable multimedia player, etc.) among the wireless communication technologies.

Currently, IEEE802.11 sets up a research group for next-generation wireless fidelity (Wi-Fi) technology, i.e., High Efficiency WLAN (HEW), to improve the throughput of the existing wireless communication. In order to improve the effective spectrum utilization and simultaneously improve the intra-area throughput, the concepts of uplink (UL), multi-user (MU) and multiple-input multiple-output (MIMO) were put forward in the discussion process of the research group, that is, multiple users perform communication of uplink data with an access point (AP) simultaneously without interfering with each other. According to the existing Wi-Fi standards, the AP receiving the uplink unicast data of the users may reply a message acknowledgment frame (ACK frame) to user equipment, specifically as shown in FIG. 1 which is a schematic principle diagram of Wi-Fi data interaction in the prior art, but replying the ACK frame to the user equipment in order is not beneficial to effective spectrum utilization and also not beneficial to power saving of the user equipment.

SUMMARY OF THE INVENTION

The technical problem to be solved by the embodiments of the present invention is to provide a data transmission method, a related device and a related system, thereby effectively improving effective spectrum utilization and simultaneously benefitting power saving of user equipment.

On a first aspect, the embodiments of the present invention provide a data transmission method including:

simultaneously receiving data simultaneously transmitted by multiple transmitters, the data includes multiple data frames simultaneously transmitted by at least one transmitter;

generating a chunking acknowledgment message frame according to a receiving state of the data, the chunking acknowledgment message frame contains a group information identifier and data receiving state information, wherein the group information identifier is used to indicate multiple transmitters which belong to the same group pre-set correspondingly by the chunking acknowledgment message frame, and the data receiving state information is used to indicate data receiving states of various transmitters which belong to the same group, the data receiving states comprise the receiving states of the multiple data frames simultaneously transmitted by at least one transmitter; and transmitting the chunking acknowledgment message frame to the multiple transmitters.

In accordance with a first embodiment of the first aspect, before generating a chunking acknowledgment message frame according to a receiving state of the data, the method further includes:

grouping the multiple transmitters;

generating a respective corresponding group information identifier and intra-group position information for each group of multiple transmitters; and correspondingly allocating the group information identifier and the intra-group position information to each of the multiple transmitters; or correspondingly allocating the group information identifier and an associated identifier to each of the multiple transmitters.

In accordance with a second embodiment of the first aspect, the group information identifier of the chunking acknowledgment message frame includes at least one of the following items:

multicast address information; or
group number information; or
broadcast address information.

In accordance with the first embodiment of the first aspect or the second embodiment of the first aspect, in a third embodiment, the step that the data receiving state information is used to indicate data receiving states of various transmitters which belong to the same group includes:

when the data of the multiple transmitters which belong to the same group is correctly received, correspondingly setting a first pre-set value in the data receiving state information; and when the data of the multiple transmitters which belong to the same group is not correctly received, correspondingly setting a second pre-set value in the data receiving state information.

In accordance with the first embodiment of the first aspect, in a fourth embodiment, the chunking acknowledgment message frame further includes the intra-group position information, and the data receiving state information is set in a mode of bitmap information; wherein, the intra-group position information in the chunking acknowledgment message frame is used to indicate various transmitters which belong to the same group to recognize respective corresponding data receiving state information; and the bitmap information is used to indicate the receiving states of one data frame or multiple data frames of various transmitters which belong to the same group.

In accordance with the first embodiment of the first aspect, in a fifth embodiment, the chunking acknowledgment message frame further includes an associated identifier, and the data receiving state information is set in a mode of bitmap information; wherein, the associated identifier in the chunking acknowledgment message frame is used to indicate various transmitters which belong to the same group to determine respective corresponding data receiving state information; and the bitmap information is used to indicate the receiving states of one data frame or multiple data frames of various transmitters which belong to the same group.

On a second aspect, the embodiments of the present invention provide a data transmission method, including:

simultaneously transmitting multiple data frames to a receiver;

receiving a chunking acknowledgment message frame responded by the receiver, the chunking acknowledgment message frame contains a group information identifier and data receiving state information, wherein the group information identifier is used to indicate multiple transmitters which belong to the same group correspondingly by the chunking acknowledgment message frame, and the data receiving state information is used to indicate data receiving states of each of various transmitters which belong to the same group, the data receiving states comprise the receiving states of the multiple data frames simultaneously transmitted by a transmitter; and after analyzing the group information identifier in the chunking acknowledgment message frame and acknowledging receiving the chunking acknowledgment message frame, analyzing the data receiving state information in the chunking acknowledgment message frame to acquire corresponding data receiving states of the transmitter.

In accordance with a first embodiment of the second aspect, after acquiring corresponding data receiving states of the transmitter, the method further includes: according to the corresponding data receiving states of the transmitter, re-transmitting the data which is not correctly received.

In accordance with the first embodiment of the second aspect, in a second embodiment, the method further includes: receiving a group information identifier and intra-group position information allocated by the data receiver or receiving a group information identifier and an associated identifier allocated by the data receiver;

after receiving a chunking acknowledgment message frame responded by the data receiver, and before analyzing the data receiving state information in the chunking acknowledgment message frame, the method further includes:

analyzing the group information identifier in the chunking acknowledgment message frame, and when the analyzed group information identifier is identical to the allocated group information identifier, acknowledging receiving the chunking acknowledgment message frame.

In accordance with the second embodiment of the second aspect, in a third embodiment, the chunking acknowledgment message frame further includes the intra-group position information; after acknowledging receiving the chunking acknowledgment message frame, and before analyzing the data receiving state information in the chunking acknowledgment message frame to acquire corresponding data receiving states of the transmitter, the method further includes:

according to the intra-group position information allocated by the data receiver, analyzing the intra-group position information in the chunking acknowledgment message frame to acquire corresponding data receiving state information of the transmitter;

the data receiving state information is set in a mode of bitmap information; the bitmap information is used to indicate the receiving states of multiple data frames of various transmitters which belong to the same group, and the step of analyzing the data receiving state information in the chunking acknowledgment message frame to acquire corresponding data receiving states of the transmitter includes:

analyzing the corresponding bitmap information of the transmitter from the acquired corresponding data receiving state information of the transmitter to acquire corresponding data receiving states of multiple data frames simultaneously transmitted by the transmitter.

In accordance with the second embodiment of the second aspect, in a fourth embodiment, the chunking acknowledgment message frame further includes an associated identifier; after acknowledging receiving the chunking acknowledgment message frame, and before analyzing the data receiving state information in the chunking acknowledgment message frame to acquire corresponding data receiving states of the transmitter, the method further includes:

according to the associated identifier allocated by the data receiver, analyzing the associated identifier in the chunking acknowledgment message frame to acquire corresponding data receiving state information of the transmitter;

the data receiving state information is set in a mode of bitmap information; the bitmap information is used to indicate the receiving states of multiple data frames of various transmitters which belong to the same group, and the step of analyzing the data receiving state information in the chunking acknowledgment message frame to acquire corresponding data receiving states of the transmitter includes:

analyzing the corresponding bitmap information of the transmitter from the acquired corresponding data receiving state information of the transmitter to acquire corresponding data receiving states of multiple data frames simultaneously transmitted by the transmitter.

On a third aspect, the embodiments of the present invention provide a wireless receiving device, including:

a data receiving module for simultaneously receiving data simultaneously transmitted by multiple transmitters, the data includes multiple data frames simultaneously transmitted by at least one transmitter;

a chunking acknowledgment generating module for generating a chunking acknowledgment message frame according to a receiving state of the data, the chunking acknowledgment message frame contains a group information identifier and data receiving state information, wherein the group information identifier is used to indicate the chunking acknowledgment message frame to correspond to pre-set multiple transmitters which belong to the same group, and the data receiving state information is used to indicate data receiving states of various transmitters which belong to the same group, the data receiving states include the receiving states of the multiple data frames simultaneously transmitted by at least one transmitter; and a chunking acknowledgment transmitting module for transmitting the chunking acknowledgment message frame to the multiple transmitters.

In accordance with a first embodiment of the third aspect, the device further includes: a grouping module for grouping the multiple transmitters before the chunking acknowledgment generating module generates the chunking acknowledgment message frame according to the receiving state of the uplink data;

a group information generating module for generating a respective corresponding group information identifier and intra-group position information for each group of multiple transmitters; and an allocation module for correspondingly allocating the group information identifier and the intra-group position information to each of the multiple transmitters; or correspondingly allocating the group information identifier and an associated identifier to each of the multiple transmitters.

In accordance with a second embodiment of the third aspect, the group information identifier of the chunking acknowledgment message frame includes at least one of the following items:

multicast address information; or group number information; or broadcast address information.

In accordance with the first embodiment of the third aspect or the second embodiment of the third aspect, in a third embodiment, the chunking acknowledgment generating module includes:

a first setting unit for correspondingly setting a first pre-set value in the data receiving state information when the data of the multiple transmitters which belong to the same group is correctly received; and a second setting unit for correspondingly setting a second pre-set value in the data receiving state information when the data of the multiple transmitters which belong to the same group is not correctly received.

In accordance with the first embodiment of the third aspect, in a fourth embodiment, the chunking acknowledgment message frame further includes the intra-group position information, and the data receiving state information is set in a mode of bitmap information; wherein, the intra-group position information in the chunking acknowledgment message frame is used to indicate various transmitters which belong to the same group to recognize respective corresponding data receiving state information; and the bitmap information is used to indicate the receiving states of one data frame or multiple data frames of various transmitters which belong to the same group.

In accordance with the first embodiment of the third aspect, in a fifth embodiment, the chunking acknowledgment message frame further includes an associated identifier, and the data receiving state information is set in a mode of bitmap information; wherein, the associated identifier in the chunking acknowledgment message frame is used to indicate various transmitters which belong to the same group to recognize respective corresponding data receiving state information; and the bitmap information is used to indicate the receiving states of one data frame or multiple data frames of various transmitters which belong to the same group.

On a fourth aspect, the embodiments of the present invention provide a wireless transmitting device including:

a data transmitting module for simultaneously transmitting multiple data frames to a data receiver;

a chunking acknowledgment receiving module for receiving a chunking acknowledgment message frame responded by the data receiver, the chunking acknowledgment message frame contains a group information identifier and data receiving state information, wherein the group information identifier is used to indicate multiple transmitters which belong to the same group pre-set correspondingly by the chunking acknowledgment message frame, and the data receiving state information is used to indicate the data receiving states of various transmitters which belong to the same group, the data receiving states comprise the receiving states of the multiple data frames simultaneously transmitted by a transmitter; and a receiving state acquisition module for analyzing the data receiving state information in the chunking acknowledgment message frame to acquire corresponding data receiving states of the transmitter, after analyzing the group information identifier in the chunking acknowledgment message frame and acknowledging receiving the chunking acknowledgment message frame.

In accordance with a first embodiment of the fourth aspect, the device further includes:

a re-transmitting module for re-transmitting the data which is not correctly received according to the corresponding data receiving states of the transmitter after the receiving state acquisition module acquires the corresponding data receiving states of the transmitter.

In accordance with the first embodiment of the fourth aspect, in a second embodiment, the device further includes:

an allocated information receiving module for receiving a group information identifier and intra-group position information allocated by the data receiver or receiving a group information identifier and an associated identifier allocated by the data receiver; and a group information analyzing module for analyzing the group information identifier in the chunking acknowledgment message frame after the chunking acknowledgment receiving module receives a chunking acknowledgment message frame responded by the data receiver and before the receiving state acquisition module analyzes the data receiving state information in the chunking acknowledgment message frame, and acknowledging receiving the chunking acknowledgment message frame when the analyzed group information identifier is identical to the allocated group information identifier.

In accordance with the second embodiment of the fourth aspect, in a third embodiment, the chunking acknowledgment message frame further includes the intra-group position information, the device further includes:

a first position analyzing module for analyzing the intra-group position information in the chunking acknowledgment message frame to acquire corresponding data receiving state information of the transmitter according to the intra-group position information allocated by the data receiver, after the group information analyzing module acknowledges receiving the chunking acknowledgment message frame, and before the receiving state acquisition module analyzes the data receiving state information in the chunking acknowledgment message frame;

the data receiving state information is set in a mode of bitmap information; the bitmap information is used to indicate the receiving states of multiple data frames of various transmitters which belong to the same group, and the receiving state acquisition module is specifically used for analyzing the corresponding bitmap information of the transmitter from the corresponding data receiving state information, acquired by the first position analyzing module, of the transmitter to acquire corresponding data receiving states of multiple data frames simultaneously transmitted by the transmitter.

In accordance with the second embodiment of the fourth aspect, in a fourth embodiment, the chunking acknowledgment message frame further includes an associated identifier, and the device further includes:

a second position analyzing module for analyzing the associated identifier in the chunking acknowledgment message frame to acquire corresponding data receiving state information of the transmitter according to the associated identifier allocated by the data receiver, after the group information analyzing module acknowledges receiving the chunking acknowledgment message frame, and before the receiving state acquisition module analyzes the data receiving state information in the chunking acknowledgment message frame;

the data receiving state information is set in a mode of bitmap information; the bitmap information is used to indicate the receiving states of multiple data frames of various transmitters which belong to the same group, and the receiving state acquisition module is specifically used for analyzing the corresponding bitmap information of the transmitter from the corresponding data receiving state information, acquired by the second position analyzing module, of the transmitter to acquire corresponding data receiving states of multiple data frames simultaneously transmitted by the transmitter.

On a fifth aspect, the embodiments of the present invention provide a data transmission system, including a data transmitting device and a data receiving device, wherein the data receiving device is the wireless receiving device in the third aspect or in the first, second, third, fourth or fifth embodiment of the third aspect;

the data transmitting device is the wireless transmitting device in the fourth aspect or in the first, second, third or fourth embodiment of the fourth aspect.

By implementing the embodiments of the present invention, station devices are grouped in advance, and a chunking acknowledgment message frame is generated according to the receiving state of the data to indicate the receiving state of the data respectively transmitted by each group of station devices, thereby reducing the quantity of ACK frames transmitted during data communication of both parties, solving the technical problems of being not beneficial to effective spectrum utilization and being not beneficial to power saving of user equipment which are caused by replying an ACK frame to the user equipment in order in the prior art, greatly improving the effective spectrum utilization, and simultaneously benefiting power saving of the user equipment.

BRIEF DESCRIPTION OF THE DRAWINGS

In order to illustrate the technical solutions in the embodiments of the present invention or in the prior art more clearly, a brief introduction will be made below to the drawings required in the embodiments or the description of the prior art. Apparently, the drawings described below are some embodiments of the present invention only, and other drawings could be obtained based on the drawings by those of ordinary skill in the art without any creative effort.

DETAILED DESCRIPTION OF THE EMBODIMENTS

A clear and complete description of the technical solutions in the embodiments of the present invention will be given below, in combination with the accompanying drawings in the embodiments of the present invention. Apparently, the described embodiments are only a part, but not all, of the embodiments of the present invention. All of the other embodiments, obtained by those of ordinary skill in the art based on the embodiments of the present invention without any inventive effort, fall into the protection scope of the present invention.

It should be noted that the terms used in the embodiments of the present invention are for describing specific embodiments only, rather than limiting the present invention. The singular forms "one", "said" and "the" used in the embodiments of the present invention and the appended claims intend to include plural forms, unless the context clearly expresses other meanings. It should also be understood that the term "and/or" used in the description indicates and includes any of or all the possible combinations of one or more relevant listed items.

Figure 1:
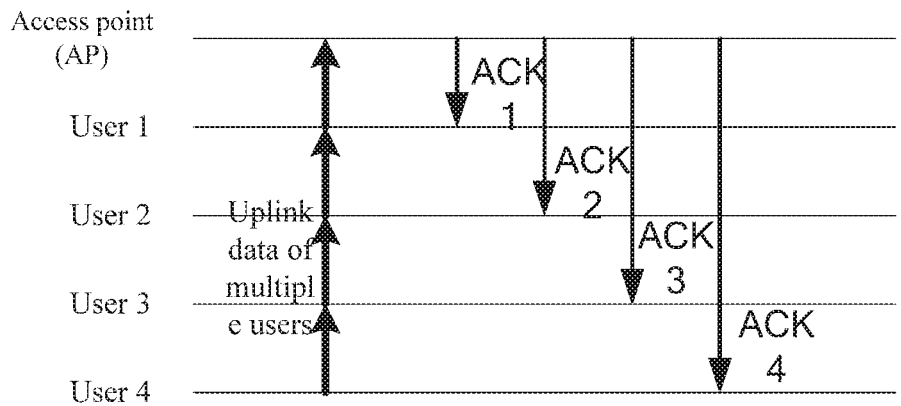
FIG. 1 is a schematic principle diagram of Wi-Fi data interaction in the prior art.
Figure 2:
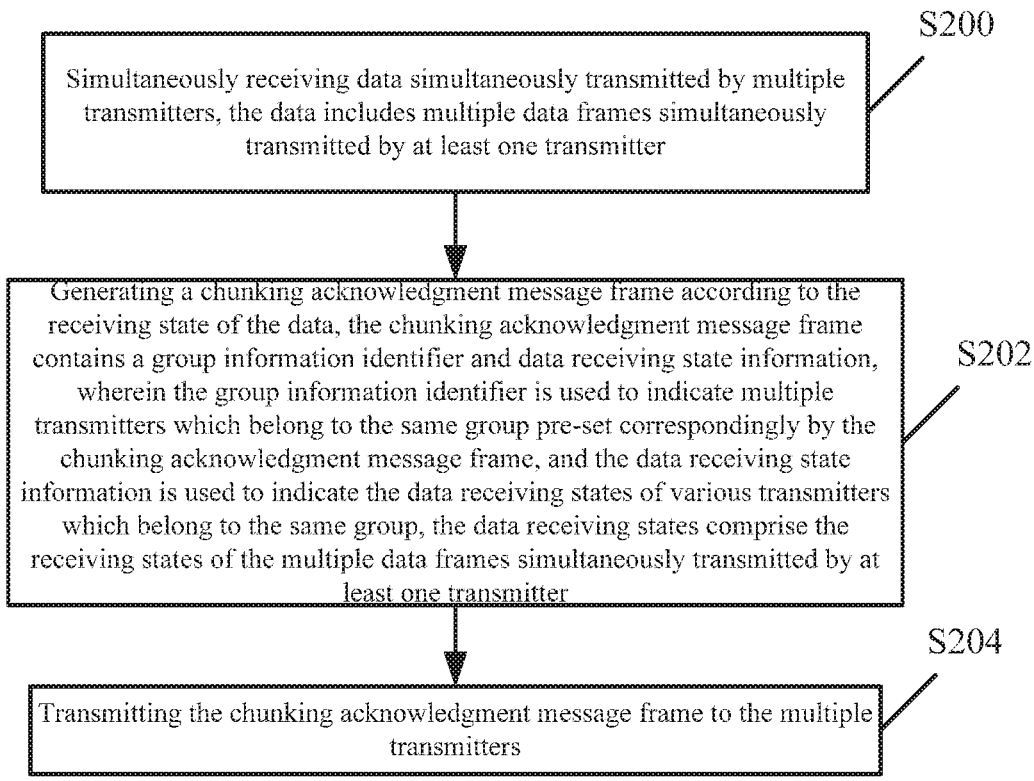
FIG. 2 is a schematic flow diagram of a data transmission method provided by the present invention.

See FIG. 2, which is a schematic flow diagram of a data transmission method provided by the present invention. According to the technical solution of the present invention described from a data receiver, the method includes the following steps:

Step S200: simultaneously receiving data simultaneously transmitted by multiple transmitters, the data includes multiple data frames simultaneously transmitted by at least one transmitter.

Specifically, the data receiver in the embodiment of the present invention may be an access point (AP), the multiple transmitters may be stations (STAs), and the data may be uplink data simultaneously transmitted from the multiple STAs to the AP; each transmitter can simultaneously transmit multiple data frames, and all the transmitters can simultaneously transmit multiple data frames; each embodiment of the present invention is not limited to the AP and the STAs, and all the other both-party devices for peer to multi-peer (P2MP) are available.

Step S202: generating a chunking acknowledgment message frame according to a receiving state of the data, the chunking acknowledgment message frame contains a group information identifier and data receiving state information, wherein the group information identifier is used to indicate multiple transmitters which belong to the same group pre-set correspondingly by the chunking acknowledgment message frame, and the data receiving state information is used to indicate the data receiving states of various transmitters which belong to the same group, the data receiving states include the receiving states of the multiple data frames simultaneously transmitted by at least one ender.

Specifically, one chunking acknowledgment message frame corresponds to multiple transmitters which belong to the same group, the chunking acknowledgment message frame is indicated by the group information identifier in the chunking acknowledgment message frame to correspond to multiple transmitters which belong to the same group, that is, the acknowledgment data in the chunking acknowledgment message frame is to be transmitted to the corresponding multiple transmitters which belong to the same group, the acknowledgment data can be illustrated by the data receiving state information in the chunking acknowledgment message frame, indicating the data receiving states of various transmitters which belong to the same group, e.g., indicating which multiple transmitter fails to receive data, and which multiple transmitter receives data successfully, etc., and in the case in which a certain transmitter simultaneously transmits multiple data frames, the data receiving states further include the receiving states of the multiple data frames simultaneously transmitted by the transmitter.

Step 204: transmitting the chunking acknowledgment message frame to the multiple transmitters.

Specifically, after the receiver transmits the generated chunking acknowledgment message frame to the multiple transmitters in a broadcast mode, the multiple transmitters corresponding to the chunking acknowledgment message frame will analyze the chunking acknowledgment message frame to determine whether the data transmitted by them is correctly received.

Figure 3:
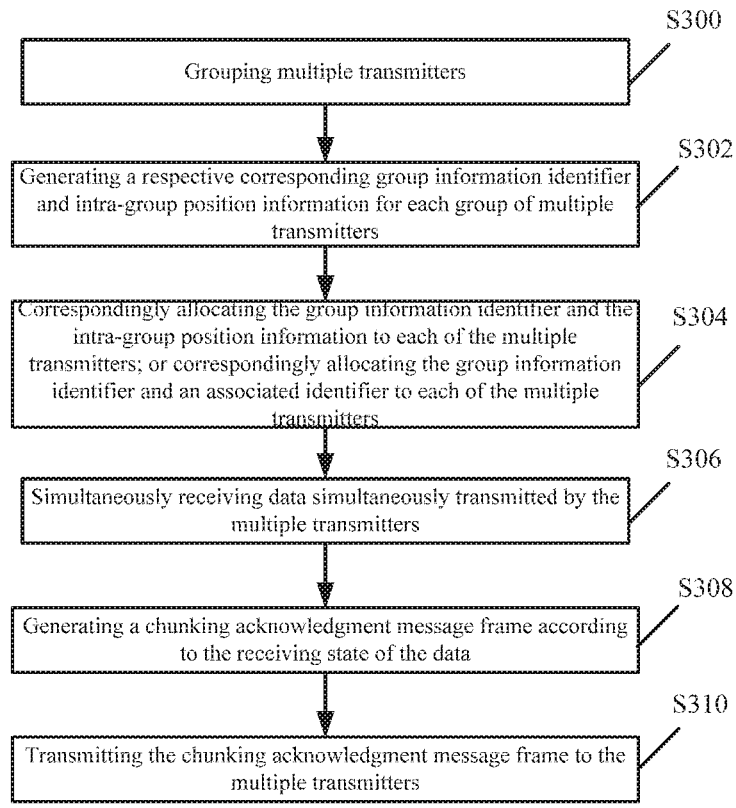
FIG. 3 is a schematic flow diagram of a data transmission method of another embodiment provided by the present invention.

Further, as shown in FIG. 3 which is a schematic flow diagram of a data transmission method of another embodiment provided by the present invention, the method includes the following steps:

Step S300: grouping multiple transmitters.

Specifically, in the embodiment of the present invention, before generating a chunking acknowledgment message frame according to the receiving state of data, a receiver can negotiate with multiple user transmitters and group the multiple transmitters according to the practical communication environment; for example, when the data receiver is AP and the multiple transmitters are STAs, the AP can group the multiple transmitters according to interference values when the STAs run, e.g., divide the transmitters with low mutual interference values into one group, and divide the transmitters with high mutual interference values into another group, etc.

Step S302: generating a respective corresponding group information identifier and intra-group position information for each group of multiple transmitters.

Specifically, the group information identifier is used to indicate the group to which various transmitters in the group belong to, and the group information identifier in each embodiment of the present invention may be multicast address information, group number information or broadcast address information, or any combination of the information, etc.; the intra-group position information is used to indicate intra-group positions of various transmitters in the group, for example, the AP divides four STAs into the same group, and allocates intra-group position information for the four STAs, to indicate which STAs are the first, second, third and fourth STAs.

Step S304: correspondingly allocating the group information identifier and the intra-group position information to each of the multiple transmitters; or correspondingly allocating the group information identifier and an associated identifier to each of the multiple transmitters.

Specifically, the multiple transmitters can determine their group from the received allocated group information identifier, and determine their intra-group positions from the received intra-group position information or associated identifier.

Step S306: simultaneously receiving data simultaneously transmitted by the multiple transmitters.

Step S308: generating a chunking acknowledgment message frame according to the receiving state of the data.

Step S310: transmitting the chunking acknowledgment message frame to the multiple transmitters.

Specifically, for steps S306 to S310, a reference may be made to steps S200 to S204 in the embodiment of FIG. 2; after receiving the corresponding chunking acknowledgment message frame themselves, the multiple transmitters analyze the chunking acknowledgment message frame, then determine whether the data transmitted by them is correctly received according to the intra-group positions corresponding to themselves, and after determining that the data transmitted by them is not correctly received, re-transmit the data to the data receiver.

Further, the data receiving state information in the embodiment of the present invention is used to indicate the data receiving states of various transmitters which belong to the same group, specifically including: when the data of the multiple transmitters which belong to the same group is correctly received, correspondingly setting a first pre-set value in the data receiving state information; and when the data of the multiple transmitters which belong to the same group is not correctly received, correspondingly setting a second pre-set value in the data receiving state information.

The first pre-set value may be "1", and the second pre-set value may be "0"; or in turn, the first pre-set value is "0", and the second pre-set value is "1", as long as both communication parties agree with each other.

Figure 4:
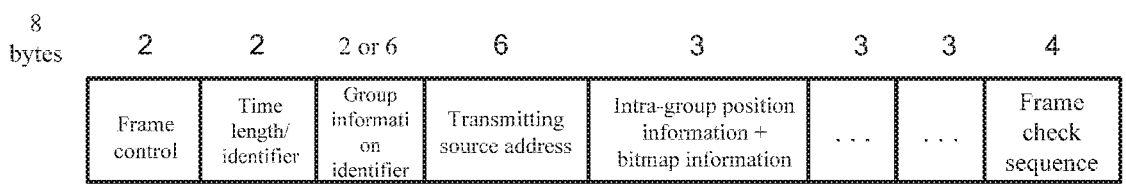
FIG. 4 is a structural schematic diagram of a chunking acknowledgment message frame format provided by the present invention.

Still further, the chunking acknowledgment message frame in the embodiment of the present invention may further include the intra-group position information or associated identifier, and the intra-group position information or associated identifier in the chunking acknowledgment message frame is used to indicate various transmitters which belong to the same group to recognize respective corresponding data receiving state information; the data receiving state information is set in a mode of Bitmap information; the bitmap information corresponds to the intra-group position information in the embodiment of the present invention, to indicate the data receiving states of various transmitters which belong to the same group. Structures of two chunking acknowledgment message frame formats provided by the embodiments of the present invention will be illustrated below:

1. As shown in FIG. 4 which is a structural schematic diagram of a chunking acknowledgment message frame format provided by the present invention, the chunking acknowledgment message frame may include: frame control, time length/identifier, group information identifier, transmitting source address, intra-group position information, bitmap information and frame check sequence.

Specifically, the group information identifier can be used for addressing of transmitters (e.g., station devices); the intra-group position information in the chunking acknowledgment message frame is used to indicate various transmitters which belong to the same group to recognize respective corresponding data receiving state information; the intra-group position information can be combined together with the bitmap information, for example, the intra-group position information is "00000110", indicating the transmitter at position 6 in the group; if the bitmap information is "1111111100111111", it indicates that in the 16 data frames simultaneously transmitted by the transmitter at position 6, the 8$^{th}$ and 7$^{th}$ data frames are not correctly received by the data receiver; if the bitmap information is "1", it indicates that the transmitter transmits one data frame, which is correctly received by the data receiver. After each device of the group receives and analyzes the chunking acknowledgment message frame, they determine whether the data transmitted by them is correctly received, and the transmitter re-transmits the 8$^{th}$ and 7$^{th}$ data frames to the data receiver.

It could be understood that when multiple transmitters analyze the group information identifier in the chunking acknowledgment message frame and discover that the group information identifier is consistent with the allocated group number information, they further analyze the source address in the chunking acknowledgment message frame, otherwise, they do not accept the chunking acknowledgment message frame and discard the chunking acknowledgment message frame. If the group has multiple transmitters, multiple pieces of intra-group position information and multiple pieces of bitmap information are included between the transmitting source address and the frame check sequence in FIG. 4, namely each piece of intra-group position information and each piece of bitmap information can correspond to one transmitter.

Figure 5:
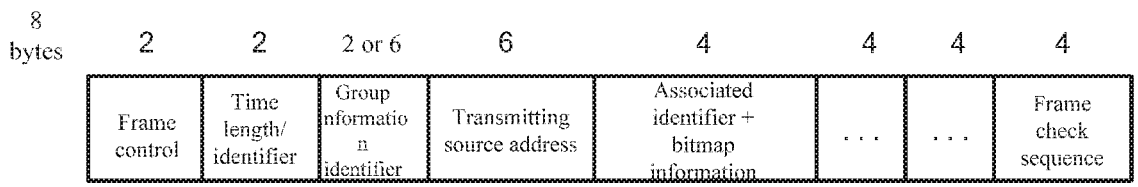
FIG. 5 is a structural schematic diagram of a chunking acknowledgment message frame format of another embodiment provided by the present invention.

2. As shown in FIG. 5 which is a structural schematic diagram of a chunking acknowledgment message frame format of another embodiment provided by the present invention, the chunking acknowledgment message frame may include: frame control, time length/identifier, group information identifier, transmitting source address, associated identifier (AID), bitmap information and frame check sequence. Specifically, the associated identifier is used to indicate various transmitters which belong to the same group to recognize respective corresponding data receiving state information; the associated identifier can be combined together with the bitmap information, for example, the associated identifier is "0000000000000011", indicating the transmitter having an associated identifier value 3 in the group; if the bitmap information is "1111111100111111", it indicates that in the 16 data frames simultaneously transmitted by the transmitter having the associated identifier value 3, the 8$^{th}$ and 7$^{th}$ data frames are not correctly received by the data receiver; if the bitmap information is "0", it indicates that the transmitter transmits one data frame, which is not correctly received by the data receiver. After each device of the group receives and analyzes the chunking acknowledgment message frame, they determine whether the data transmitted by them is correctly received, and the transmitter re-transmitts the 8$^{th}$ and 7$^{th}$ data frames to the data receiver.

It could be understood that when multiple transmitters analyze the multicast address information in the chunking acknowledgment message frame and discover that the multicast address information is consistent with the allocated multicast address information, they further analyze the source address in the chunking acknowledgment message frame, otherwise, they do not accept the chunking acknowledgment message frame and discard the chunking acknowledgment message frame. If the group has multiple transmitters, multiple associated identifiers and multiple pieces of bitmap information are included between the transmitting source address and the frame check sequence in FIG. 5, namely each associated identifier and each piece of bitmap information can correspond to one transmitter.

It should be noted that the group information identifier in each embodiment of the present invention may be any of the following items:

taking group number information as the group information identifier for illustrating, e.g., the group number information is "00000011", indicating that the group is the 3$^{rd}$ group;

taking multicast address information as the group information identifier for illustrating, e.g., the multicast address information may be 6-byte address information, similar to an MAC (Multimedia Access Control) address, indicating the group to which it belongs;

taking group number information and multicast address information as the group information identifier for illustrating, i.e., the two domains of the group number information and the multicast address information can also be combined to generate new information, to indicate the chunking acknowledgment message frame to correspond to multiple transmitters which belong to the same group, and the present invention is not limited thereto. Similarly, the group information identifier in the above embodiments may also be broadcast address information or a random combination of the broadcast address information and group number information or multicast address information, which is not redundantly described herein.

It should be noted that in FIG. 4 or FIG. 5, the bitmap information is not limited to 1 byte or 2 bytes and can be dynamically set by the data receiver according to the practical condition, for example, when the data receiver is an access point device and the transmitters are station devices, the transmission opportunity (TXOP) allocated to the station devices by the access point device are certain, the modulation and coding scheme (MCS) mode with each station device is also certain, then the number of data frames continuously transmitted by the station devices can be calculated, and bits of the bitmap information can thus be set.

It should be noted that in the wireless communication method in the embodiments of the present invention, the problem of compatibility does not need to be considered. Old STAs can analyze the physical header of the ACK to obtain the time length of the whole frame, so the wireless communication method accords with the existing random back-off mechanism; and a new ACK frame format can be defined and encapsulated via Type and Subtype sub-domains of a Frame control domain of the MAC frame header, specifically expressed as follows:

| Type Value Type b3 b2 | Type Description | Subtype Value b7 b6 b5 b4 | Subtype Description |
|---|---|---|---|
| 00 | management | 1110 | no acknowledgment message action frame |
| 01 | control | 1001 | Block acknowledgment frame |
| 01 | control | 0110 | chunking acknowledgment frame |

Correspondingly, in combination with FIG. 6 which is a schematic flow diagram of a data transmission method of another embodiment provided by the present invention, the technical solution of the present invention will be described below from multiple transmitters, wherein the method includes the following steps:

step S600: simultaneously transmitting multiple data frames to a data receiver;

step S602: receiving a chunking acknowledgment message frame responded by the data receiver, the chunking acknowledgment message frame contains a group information identifier and data receiving state information, wherein the group information identifier is used to indicate multiple transmitters which belong to the same group pre-set correspondingly by the chunking acknowledgment message frame, and the data receiving state information is used to indicate the data receiving states of various transmitters which belong to the same group, the data receiving states include the receiving states of the multiple data frames simultaneously transmitted by a transmitter; and step S604: after analyzing the group information identifier in the chunking acknowledgment message frame and acknowledging receiving the chunking acknowledgment message frame, analyzing the data receiving state information in the chunking acknowledgment message frame to acquire corresponding data receiving states of the transmitter.

Specifically, after acquiring corresponding data receiving states of the transmitter, the method further includes: according to the corresponding data receiving states of the transmitter, re-transmitting the data which is not correctly received.

Further, before step S702 in the embodiment of the present invention, the method may further include a step of receiving a group information identifier and intra-group position information allocated by the data receiver or receiving a group information identifier and an associated identifier allocated by the data receiver; after step S702 of receiving a chunking acknowledgment message frame responded by the data receiver, and before step S704 of analyzing the data receiving state information in the chunking acknowledgment message frame, the method may further include: analyzing the group information identifier in the chunking acknowledgment message frame, and when the analyzed group information identifier is identical to the allocated group information identifier, acknowledging receiving the chunking acknowledgment message frame.

Further, the chunking acknowledgment message frame in the embodiment of the present invention may further include the intra-group position information; after acknowledging receiving the chunking acknowledgment message frame, and before analyzing the data receiving state information in the chunking acknowledgment message frame to acquire corresponding data receiving states of the transmitter, the method further includes:

according to the intra-group position information allocated by the data receiver, analyzing the intra-group position information in the chunking acknowledgment message frame to acquire corresponding data receiving state information of the transmitter;

moreover, the data receiving state information may be set in a mode of bitmap information; the bitmap information is used to indicate the receiving states of multiple data frames of various transmitters which belong to the same group, and the step of analyzing the data receiving state information in the chunking acknowledgment message frame to acquire corresponding data receiving states of the transmitter includes: analyzing the corresponding bitmap information of the transmitter from the acquired corresponding data receiving state information of the transmitter to acquire corresponding data receiving states of multiple data frames simultaneously transmitted by the transmitter.

Specifically, with reference to FIG. 4, it is supposed that the intra-group position information allocated by the data receiver and received by the transmitter A is "00000110", i.e., indicating that the intra-group position is 6, then after the transmitter A acknowledges receiving the chunking acknowledgment message frame, it analyzes the intra-group position information in the chunking acknowledgment message frame, finds out the data receiving state information corresponding to the intra-group position information of "00000110", e.g., bitmap information of "1111111100111111", and then it can determine that in the 16 data frames transmitted simultaneously, the $8^{th}$ and $7^{th}$ data frames are not correctly received by the data receiver and need to be re-transmitted.

Further, the chunking acknowledgment message frame in the embodiment of the present invention may further include an associated identifier; after acknowledging receiving the chunking acknowledgment message frame, and before analyzing the data receiving state information in the chunking acknowledgment message frame to acquire corresponding data receiving states of the transmitter, the method further includes: according to the associated identifier allocated by the data receiver, analyzing the associated identifier in the chunking acknowledgment message frame to acquire corresponding data receiving state information of the transmitter;

moreover, the data receiving state information is set in a mode of bitmap information; the bitmap information is used to indicate the receiving states of multiple data frames of various transmitters which belong to the same group, and the step of analyzing the data receiving state information in the chunking acknowledgment message frame to acquire corresponding data receiving states of the transmitter includes: analyzing the corresponding bitmap information of the transmitter from the acquired corresponding data receiving state information of the transmitter to acquire corresponding data receiving states of multiple data frames simultaneously transmitted by the transmitter.

Specifically, with reference to FIG. 5, it is supposed that the associated identifier allocated by the data receiver and received by the transmitter B is "0000000000000011", i.e., indicating that the value of the associated identifier is 3, after the transmitter B acknowledges receiving the chunking acknowledgment message frame, it analyzes the associated identifier in the chunking acknowledgment message frame, finds out the data receiving state information corresponding to the associated identifier of "0000000000000011", e.g., bitmap information of "1111111100111111", and then it can determine that in the 16 data frames transmitted simultaneously, the $8^{th}$ and $7^{th}$ data frames are not correctly received by the data receiver and need to be re-transmitted.

Specifically, for the implementation process of the multiple transmitters, a reference may be made to the description of the embodiments of FIG. 1 to FIG. 5, which is not redundantly described herein.

By implementing the embodiments of the present invention, station devices are grouped in advance, and a chunking acknowledgment message frame is generated according to the receiving state of the data to indicate the receiving state of the data respectively transmitted by each group of station devices, thereby reducing the quantity of ACK frames transmitted during data communication of both parties, solving the technical problems of being not beneficial to effective spectrum utilization and being not beneficial to power saving of user equipment which are caused by replying an ACK frame to the user equipment in order in the prior art, greatly improving the effective spectrum utilization, and simultaneously benefiting power saving of the user equipment.

Elaborated above is the method of the embodiments of the present invention, and in order to better implement the above solutions of the embodiments of the present invention, related devices matching with the above solutions will be provided below.

Figure 7:
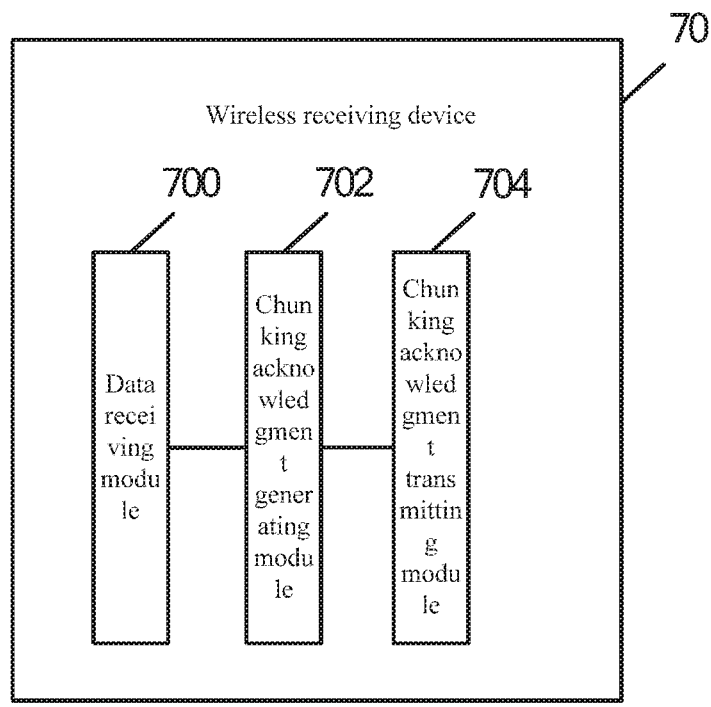
FIG. 7 is a structural schematic diagram of a wireless receiving device provided by the present invention.

As shown in FIG. 7 which is a structural schematic diagram of a wireless receiving device provided by the present invention, the wireless receiving device 70 includes a data receiving module 700, a chunking acknowledgment generating module 702 and a chunking acknowledgment transmitting module 704, wherein the data receiving module 700 is used for simultaneously receiving data simultaneously transmitted by multiple transmitters, the data includes multiple data frames simultaneously transmitted by at least one transmitter;

the chunking acknowledgment generating module 702 is used for generating a chunking acknowledgment message frame according to the receiving state of the data, the chunking acknowledgment message frame contains a group information identifier and data receiving state information, wherein the group information identifier is used to indicate the chunking acknowledgment message frame to correspond to pre-set multiple transmitters which belong to the same group, and the data receiving state information is used to indicate the data receiving states of various transmitters which belong to the same group, the data receiving states include the receiving states of the multiple data frames simultaneously transmitted by at least one transmitter; and the chunking acknowledgment transmitting module 704 is used for transmitting the chunking acknowledgment message frame to the multiple transmitters.

Figure 8:
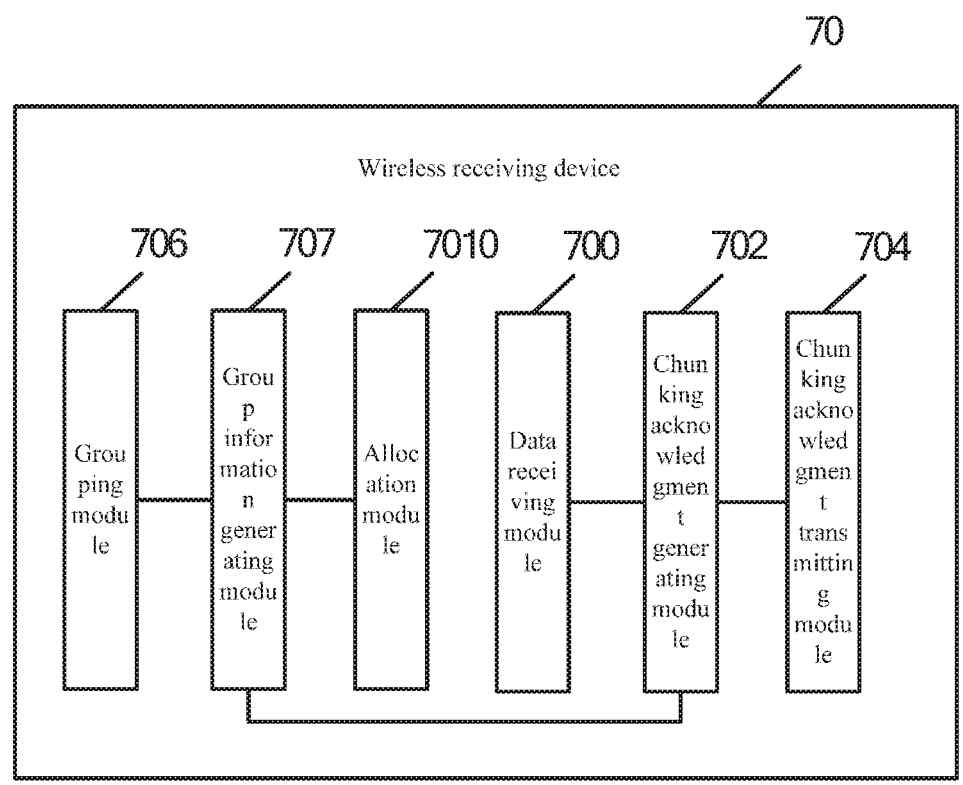
FIG. 8 is a structural schematic diagram of a wireless receiving device of another embodiment provided by the present invention.

Specifically, as shown in FIG. 8 which is a structural schematic diagram of a wireless receiving device of another embodiment provided by the present invention, besides the data receiving module 700, the chunking acknowledgment generating module 702 and the chunking acknowledgment transmitting module 704, the wireless receiving device 70 further includes a grouping module 706, a group information generating module 708 and an allocation module 7010, wherein the grouping module 706 is used for grouping the multiple transmitters before the chunking acknowledgment generating module 702 generates the chunking acknowledgment message frame according to the receiving state of the uplink data;

the group information generating module 708 is used for generating a respective corresponding group information identifier and intra-group position information for each group of multiple transmitters; and the allocation module 7010 is used for correspondingly allocating the group information identifier and the intra-group position information to each of the multiple transmitters; or correspondingly allocating the group information identifier and an associated identifier to each of the multiple transmitters.

Specifically, the group information identifier of the chunking acknowledgment message frame includes at least one of the following items: multicast address information; or group number information; or broadcast address information.

Figure 9:
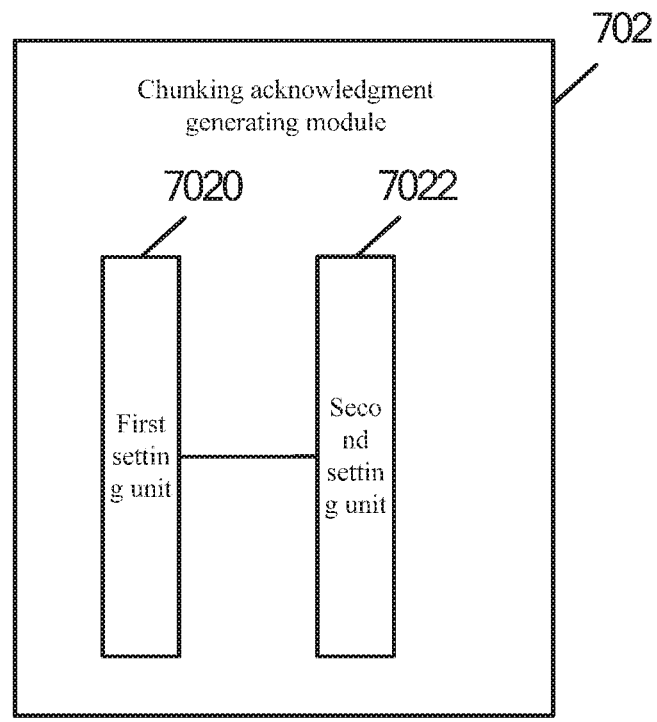
FIG. 9 is a structural schematic diagram of a chunking acknowledgment generating module provided by the present invention.

Further, as shown in FIG. 9 which is a structural schematic diagram of a chunking acknowledgment generating module provided by the present invention, the chunking acknowledgment generating module 702 includes a first setting unit 7020 and a second setting unit 7022, wherein the first setting unit 7020 is used for correspondingly setting a first pre-set value in the data receiving state information when the data of the multiple transmitters which belong to the same group is correctly received; and the second setting unit 7022 is used for correspondingly setting a second pre-set value in the data receiving state information when the data of the multiple transmitters which belong to the same group is not correctly received.

Specifically, the chunking acknowledgment message frame further includes the intra-group position information, and the data receiving state information is set in a mode of bitmap information; wherein, the intra-group position information in the chunking acknowledgment message frame is used to indicate various transmitters which belong to the same group to recognize respective corresponding data receiving state information; and the bitmap information is used to indicate the receiving states of one data frame or multiple data frames of various transmitters which belong to the same group.

More specifically, the chunking acknowledgment message frame further includes an associated identifier, and the data receiving state information is set in a mode of bitmap information; wherein, the associated identifier in the chunking acknowledgment message frame is used to indicate various transmitters which belong to the same group to recognize respective corresponding data receiving state information; and the bitmap information is used to indicate the receiving states of one data frame or multiple data frames of various transmitters which belong to the same group.

The wireless receiving device 70 in the embodiment of the present invention may be an access point device, a network management device, a router, a transmission node, an intelligent mobile terminal or other network devices.

It could be understood that, the functions of the functional modules of the wireless receiving device 70 in this embodiment can be specifically implemented according to the methods in the method embodiments, with reference to the related description of the method embodiments of FIG. 1 to FIG. 5, which is not redundantly described herein.

Elaborated above is the wireless receiving device 70 of the embodiment of the present invention, and in order to better implement the above solutions of the embodiments of the present invention, a wireless transmitting device is further provided below.

Figure 10:
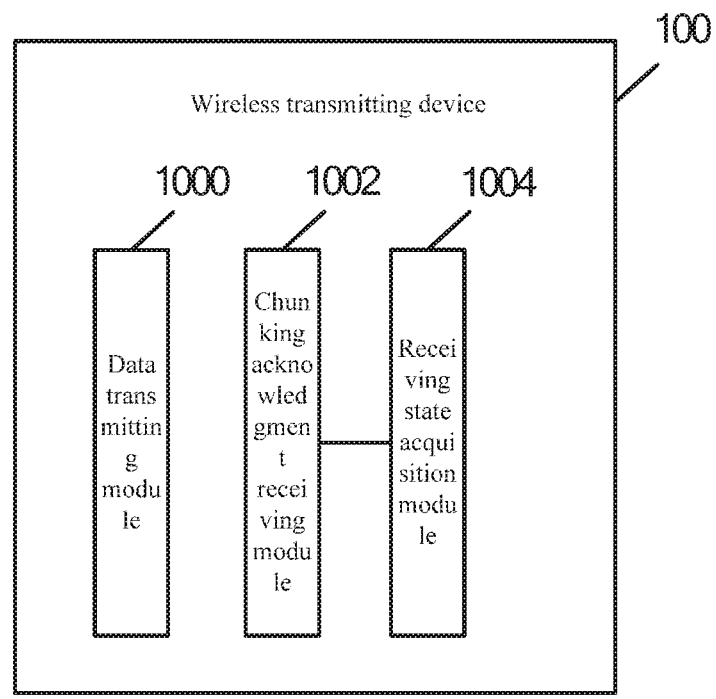
FIG. 10 is a structural schematic diagram of a wireless transmitting device provided by the present invention.

As shown in FIG. 10 which is a structural schematic diagram of a wireless transmitting device provided by the present invention, the wireless transmitting device 100 may include a data transmitting module 1000, a chunking acknowledgment receiving module 1002 and a receiving state acquisition module 1004, wherein the data transmitting module 1000 is used for simultaneously transmitting multiple data frames to a data receiver;

the chunking acknowledgment receiving module 1002 is used for receiving a chunking acknowledgment message frame responded by the data receiver, the chunking acknowledgment message frame contains a group information identifier and data receiving state information, wherein the group information identifier is used to indicate multiple transmitters which belong to the same group pre-set correspondingly by the chunking acknowledgment message frame, and the data receiving state information is used to indicate the data receiving states of various transmitters which belong to the same group, the data receiving states include the receiving states of the multiple data frames simultaneously transmitted by a transmitter; and the receiving state acquisition module 1004 is used for analyzing the data receiving state information in the chunking acknowledgment message frame to acquire corresponding data receiving states of the transmitter, after analyzing the group information identifier in the chunking acknowledgment message frame and acknowledging receiving the chunking acknowledgment message frame.

Figure 11:
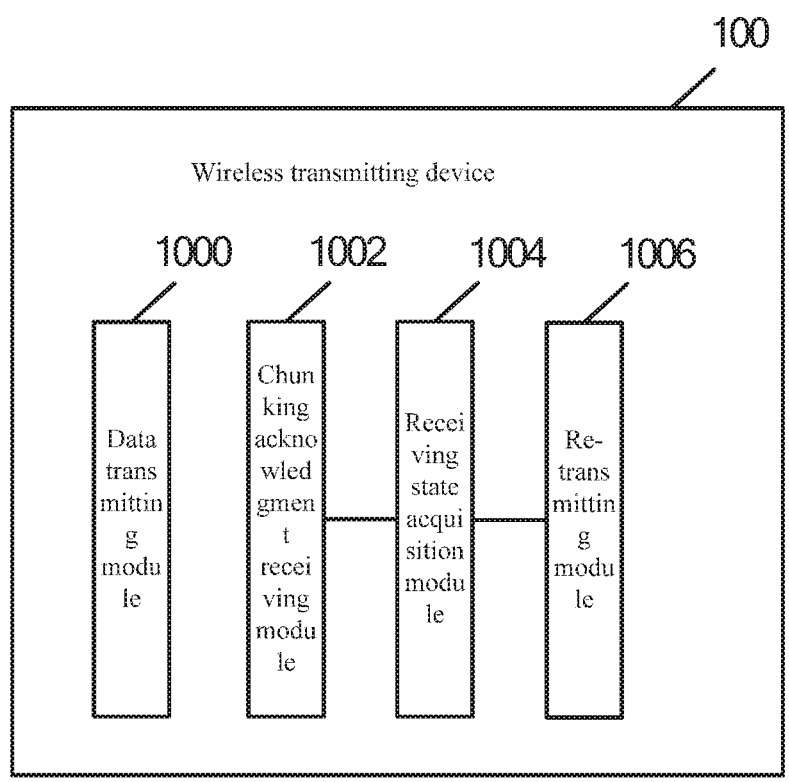
FIG. 11 is a structural schematic diagram of a wireless transmitting device of another embodiment provided by the present invention.

Specifically, as shown in FIG. 11 which is a structural schematic diagram of a wireless transmitting device of another embodiment provided by the present invention, besides the data transmitting module 1000, the chunking acknowledgment receiving module 1002 and the receiving state acquisition module 1004, the wireless transmitting device 100 may further include a re-transmitting module 1006 which is used for re-transmitting the data which is not correctly received according to the corresponding data receiving states of the transmitter after the receiving state acquisition module 1004 acquires the corresponding data receiving states of the transmitter.

Figure 12:
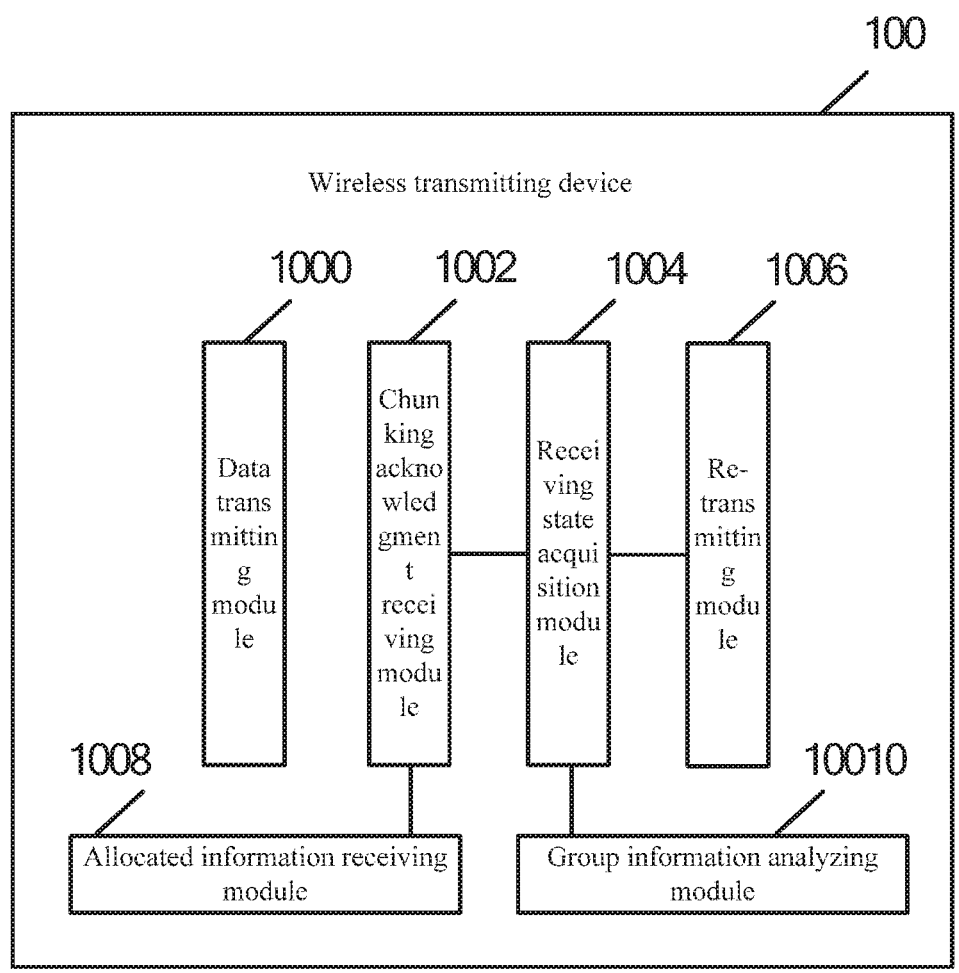
FIG. 12 is a structural schematic diagram of a wireless transmitting device of another embodiment provided by the present invention.

Further, as shown in FIG. 12 which is a structural schematic diagram of a wireless transmitting device of another embodiment provided by the present invention, besides the data transmitting module 1000, the chunking acknowledgment receiving module 1002, the receiving state acquisition module 1004 and the re-transmitting module 1006, the wireless transmitting device 100 may further include an allocated information receiving module 1008 and a group information analyzing module 10010, wherein the allocated information receiving module 1008 is used for receiving a group information identifier and intra-group position information allocated by the data receiver or receiving a group information identifier and an associated identifier allocated by the data receiver; and the group information analyzing module 10010 is used for analyzing the group information identifier in the chunking acknowledgment message frame after the chunking acknowledgment receiving module 1002 receives a chunking acknowledgment message frame responded by the data receiver and before the receiving state acquisition module analyzes the data receiving state information in the chunking acknowledgment message frame, and acknowledging receiving the chunking acknowledgment message frame when the analyzed group information identifier is identical to the allocated group information identifier.

Figure 13:
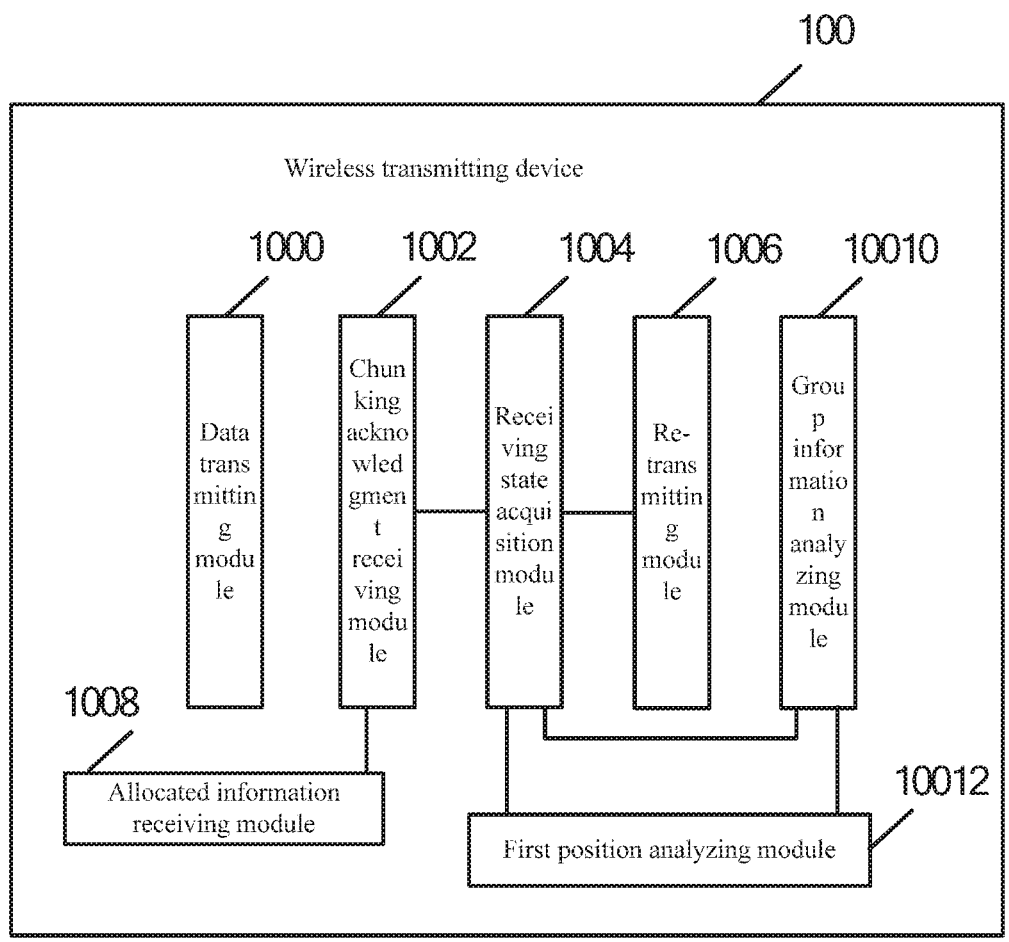
FIG. 13 is a structural schematic diagram of a wireless transmitting device of another embodiment provided by the present invention.

Further, the chunking acknowledgment message frame also includes the intra-group position information, as shown in FIG. 13 which is a structural schematic diagram of a wireless transmitting device of another embodiment provided by the present invention, the wireless transmitting device 100 may further include a first position analyzing module 10012 besides the data transmitting module 1000, the chunking acknowledgment receiving module 1002, the receiving state acquisition module 1004, the re-transmitting module 1006, the allocated information receiving module 1008 and the group information analyzing module 10010, wherein the first position analyzing module 10012 is used for analyzing the intra-group position information in the chunking acknowledgment message frame to acquire corresponding data receiving state information of the transmitter according to the intra-group position information allocated by the data receiver, after the group information analyzing module 10010 acknowledges receiving the chunking acknowledgment message frame and before the receiving state acquisition module 1004 analyzes the data receiving state information in the chunking acknowledgment message frame;

the data receiving state information is set in a mode of bitmap information; the bitmap information is used to indicate the receiving states of multiple data frames of various transmitters which belong to the same group, and the receiving state acquisition module 1004 is specifically used for analyzing the corresponding bitmap information of the transmitter from the corresponding data receiving state information, acquired by the first position analyzing module 10012, of the transmitter to acquire corresponding data receiving states of multiple data frames simultaneously transmitted by the transmitter.

Figure 14:
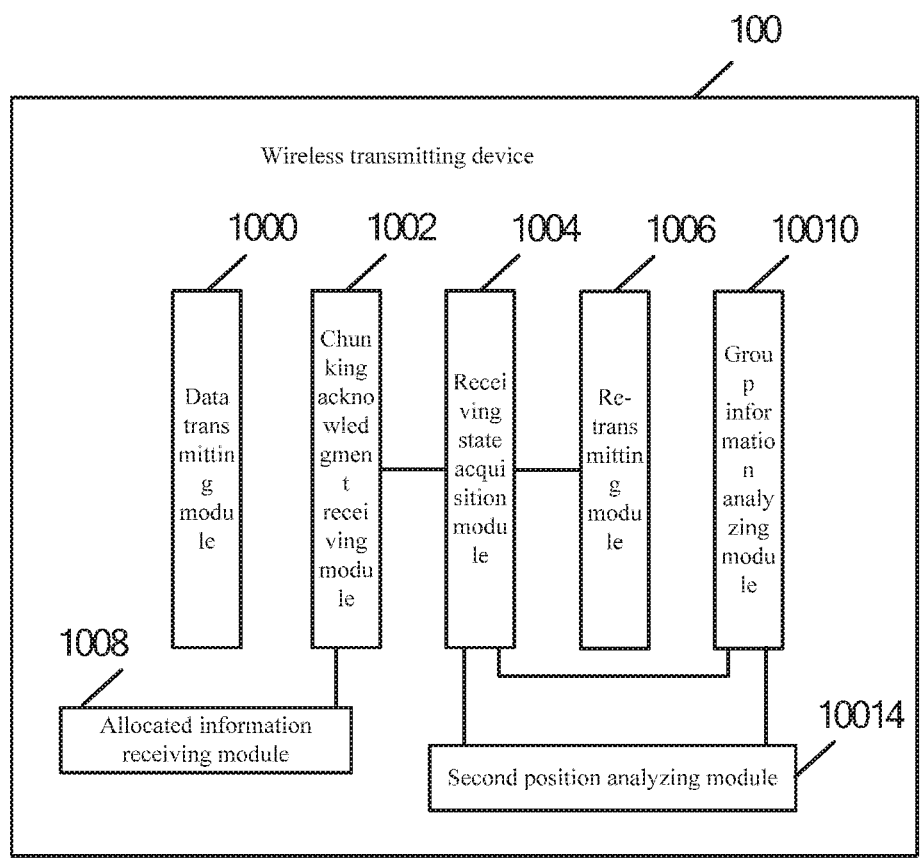
FIG. 14 is a structural schematic diagram of a wireless transmitting device of another embodiment provided by the present invention.

Further, the chunking acknowledgment message frame also includes the associated identifier, as shown in FIG. 14 which is a structural schematic diagram of a wireless transmitting device of another embodiment provided by the present invention, the wireless transmitting device 100 may further include a second position analyzing module 10014 besides the data transmitting module 1000, the chunking acknowledgment receiving module 1002, the receiving state acquisition module 1004, the re-transmitting module 1006, the allocated information receiving module 1008 and the group information analyzing module 10010, wherein the second position analyzing module 10014 is used for analyzing the associated identifier in the chunking acknowledgment message frame to acquire corresponding data receiving state information of the transmitter according to the associated identifier allocated by the data receiver, after the group information analyzing module 10010 acknowledges receiving the chunking acknowledgment message frame and before the receiving state acquisition module 1004 analyzes the data receiving state information in the chunking acknowledgment message frame;

the data receiving state information is set in a mode of bitmap information; the bitmap information is used to indicate the receiving states of multiple data frames of various transmitters which belong to the same group, and the receiving state acquisition module 1004 is specifically used for analyzing the corresponding bitmap information of the transmitter from the corresponding data receiving state information, acquired by the second position analyzing module 10014, of the transmitter to acquire corresponding data receiving states of multiple data frames simultaneously transmitted by the transmitter.

The wireless transmitting device 100 in the embodiment of the present invention may be a station device, a tablet computer, a personal digital assistant, an intelligent mobile terminal or other network devices.

Figure 6:
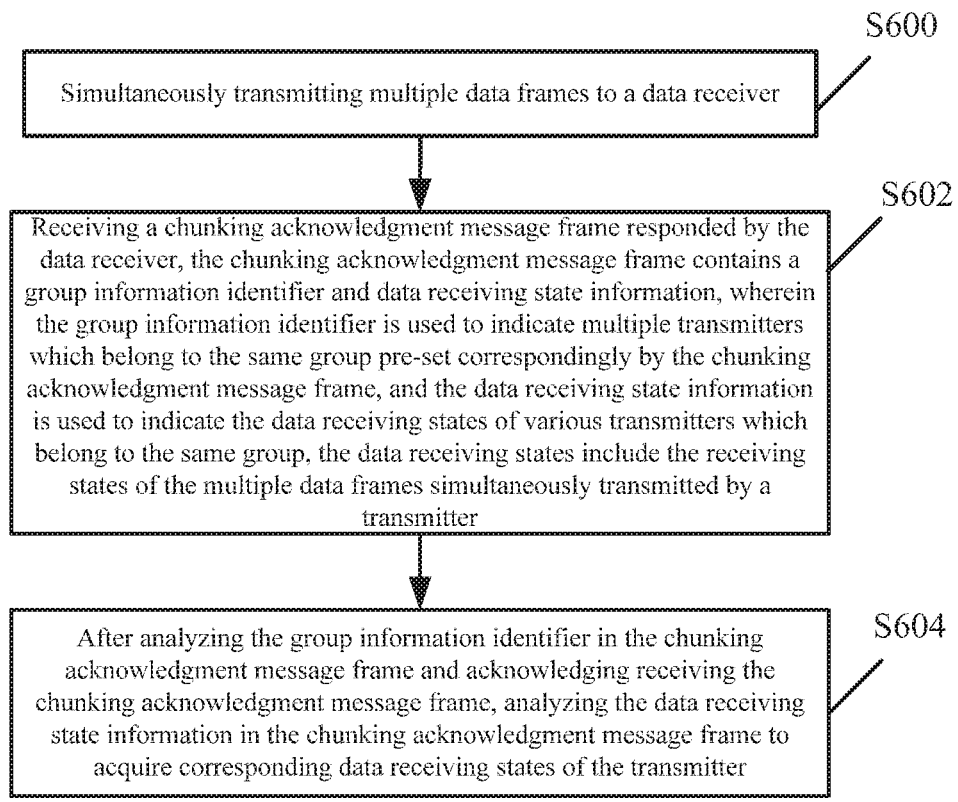
FIG. 6 is a schematic flow diagram of a data transmission method of another embodiment provided by the present invention.

It could be understood that, the functions of the functional modules of the wireless transmitting device 100 in this embodiment can be specifically implemented according to the method in the method embodiment, with reference to the related description of the method embodiment of FIG. 6, which is not redundantly described herein.

Figure 15:
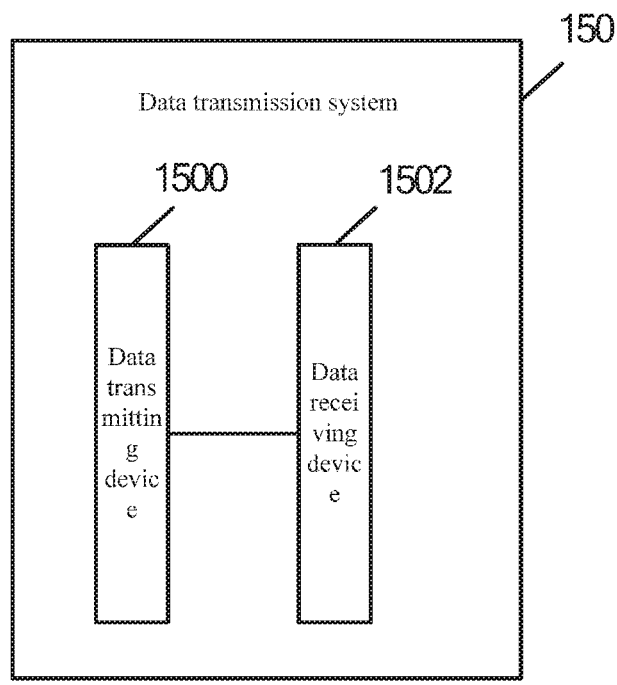
FIG. 15 is a structural schematic diagram of a data transmission system provided by the present invention.

In order to better implement the above solutions of the embodiments of the present invention, the present invention further provides a related system matching with the above solutions. The system will be elaborated below in combination with FIG. 15 which is a structural schematic diagram of a data transmission system provided by the present invention.

The data transmission system 150 includes a data transmitting device 1500 and a data receiving device 1502, wherein the data receiving device 1502 may be the wireless receiving device 70 in the above embodiment, and thus is not redundantly described herein; and the data transmitting device 1500 may be the wireless transmitting device 100 in the above embodiment, and thus is not redundantly described herein.

In conclusion, by implementing the embodiments of the present invention, station devices are grouped in advance, and a chunking acknowledgment message frame is generated according to the receiving state of the data to indicate the receiving state of the data respectively transmitted by each group of station devices, thereby reducing the quantity of ACK frames transmitted during data communication of both parties, solving the technical problems of being not beneficial to effective spectrum utilization and being not beneficial to power saving of user equipment which are caused by replying an ACK frame to the user equipment in order in the prior art, greatly improving the effective spectrum utilization, and simultaneously benefiting power saving of the user equipment.

It could be understood by those of ordinary skill in the art that all of or part of the flows in the methods of the above-mentioned embodiment may be completed by a computer program instructing related hardware, the program may be stored in a computer-readable storage medium, and when the program is executed, the flows of the embodiments of the above methods may be executed. The storage medium may be a magnetic disk, an optical disk, a read-only memory (ROM) or a random access memory (RAM), etc.

Disclosed above are merely preferred embodiments of the present invention, which certainly cannot limit the protection scope of the present invention. It could be understood by those of ordinary skill in the art that all of or part of the flows of the above embodiments can be realized, and equivalent changes made according to the claims of the present invention still fall into the scope of the present invention.

The invention claimed is:

1. A data transmission method, comprising:
   simultaneously transmitting multiple data frames to a data receiver;
   receiving a chunking acknowledgment message frame responded by the data receiver, the chunking acknowledgment message frame contains a group information identifier and data receiving state information, wherein the group information identifier is used to indicate multiple transmitters which belong to the same group pre-set according to a practical communication environment correspondingly by the chunking acknowledgment message frame, and the data receiving state information is used to indicate the data receiving states of various transmitters which belong to the same group, the data receiving states comprise the receiving states of the multiple data frames simultaneously transmitted by a transmitter; and
   after analyzing the group information identifier in the chunking acknowledgment message frame and acknowledging receiving the chunking acknowledgment message frame, analyzing the data receiving state information in the chunking acknowledgment message frame to acquire corresponding data receiving states of the transmitter,
   the method further comprising: receiving a group information identifier and intra-group position information allocated by the data receiver or receiving a group information identifier and an associated identifier allocated by the data receiver;
   after receiving the chunking acknowledgment message frame responded by the data receiver, and before analyzing the data receiving state information in the chunking acknowledgment message frame, further comprising:
   analyzing the group information identifier in the chunking acknowledgment message frame, and when the analyzed group information identifier is identical to the allocated group information identifier, acknowledging receiving the chunking acknowledgment message frame;
   wherein the chunking acknowledgment message frame further comprises the intra-group position information; after acknowledging receiving the chunking acknowledgment message frame, and before analyzing the data receiving state information in the chunking acknowledgment message frame to acquire corresponding data receiving states of the transmitter, the method further comprises:
   according to the intra-group position information allocated by the data receiver, analyzing the intra-group position information in the chunking acknowledgment message frame to acquire corresponding data receiving state information of the transmitter;
   the data receiving state information is set in a mode of bitmap information; the bitmap information is used to indicate the receiving states of multiple data frames of various transmitters which belong to the same group, and the step of analyzing the data receiving state information in the chunking acknowledgment message frame to acquire corresponding data receiving states of the transmitter comprises:
   analyzing the corresponding bitmap information of the transmitter from the acquired corresponding data receiving state information of the transmitter to acquire corresponding data receiving states of multiple data frames simultaneously transmitted by the transmitter.

2. The method of claim 1, wherein after acquiring corresponding data receiving states of the transmitter, the method further comprises:
   according to the corresponding data receiving states of the transmitter, re-transmitting the data which is not correctly received.

3. The method of claim 1, wherein the chunking acknowledgment message frame further comprises an associated identifier; after acknowledging receiving the chunking acknowledgment message frame, and before analyzing the data receiving state information in the chunking acknowledgment message frame to acquire corresponding data receiving states of the transmitter, the method further comprises:
   according to the associated identifier allocated by the data receiver, analyzing the associated identifier in the chunking acknowledgment message frame to acquire corresponding data receiving state information of the transmitter;
   the data receiving state information is set in a mode of bitmap information; the bitmap information is used to indicate the receiving states of multiple data frames of various transmitters which belong to the same group, and the step of analyzing the data receiving state information in the chunking acknowledgment message frame to acquire corresponding data receiving states of the transmitter comprises:
   analyzing the corresponding bitmap information of the transmitter from the acquired corresponding data receiving state information of the transmitter to acquire corresponding data receiving states of multiple data frames simultaneously transmitted by the transmitter.

4. A wireless transmitting device comprising:
   a data transmitter for simultaneously transmitting multiple data frames to a data receiver;
   a chunking acknowledgment receiver for receiving a chunking acknowledgment message frame responded by the data receiver, the chunking acknowledgment message frame contains a group information identifier and data receiving state information, wherein the group information identifier is used to indicate multiple transmitters which belong to the same group pre-set according to a practical communication environment correspondingly by the chunking acknowledgment message frame, and the data receiving state information is configured to indicate the data receiving states of various transmitters which belong to the same group, the data receiving states comprise the receiving states of the multiple data frames simultaneously transmitted by a transmitter; and a receiving state aquisitor for analyzing the data receiving state information in the chunking acknowledgment message frame to acquire corresponding data receiving states of the transmitter, after analyzing the group information identifier in the chunking acknowledgment message frame and acknowledging receiving the chunking acknowledgment message frame;

an allocated information receiver for receiving a group information identifier and intra-group position information allocated by the data receiver or receiving a group information identifier and an associated identifier allocated by the data receiver; and a group information analyzer for analyzing the group information identifier in the chunking acknowledgment message frame after the chunking acknowledgment receiver receives a chunking acknowledgment message frame responded by the data receiver and before the receiving state aquisitor analyzes the data receiving state information in the chunking acknowledgment message frame, and acknowledging receiving the chunking acknowledgment message frame when the analyzed group information identifier is identical to the allocated group information identifier;

wherein the chunking acknowledgment message frame further comprises the intra-group position information, the device further comprises:

a first position analyzer for analyzing the intra-group position information in the chunking acknowledgment message frame to acquire corresponding data receiving state information of the transmitter according to the intra-group position information allocated by the data receiver, after the group information analyzer acknowledges receiving the chunking acknowledgment message frame and before the receiving state aquisitor analyzes the data receiving state information in the chunking acknowledgment message frame;

the data receiving state information is set in a mode of bitmap information; the bitmap information is configured to indicate the receiving states of multiple data frames of various transmitters which belong to the same group, and the receiving state aquisitor is specifically used for analyzing the corresponding bitmap information of the transmitter from the corresponding data receiving state information, acquired by the first position analyzer, of the transmitter to acquire corresponding data receiving states of multiple data frames simultaneously transmitted by the transmitter.

5. The device of claim 4, further comprising:

a re-transmitter for re-transmitting the data which is not correctly received according to the corresponding data receiving states of the transmitter after the receiving state aquisitor acquires the corresponding data receiving states of the transmitter.

6. The device of claim 4, wherein the chunking acknowledgment message frame further comprises an associated identifier, and the device further comprises:

a second position analyzer for analyzing the associated identifier in the chunking acknowledgment message frame to acquire corresponding data receiving state information of the transmitter according to the associated identifier allocated by the data receiver, after the group information analyzer acknowledges receiving the chunking acknowledgment message frame and before the receiving state aquisitor analyzes the data receiving state information in the chunking acknowledgment message frame;

the data receiving state information is set in a mode of bitmap information; the bitmap information is used to indicate the receiving states of multiple data frames of various transmitters which belong to the same group, and the receiving state aquisitor is specifically used for analyzing the corresponding bitmap information of the transmitter from the corresponding data receiving state information, acquired by the second position analyzer, of the transmitter to acquire corresponding data receiving states of multiple data frames simultaneously transmitted by the transmitter.

* * * * *